2,958,891
WINDSHIELD WASHER

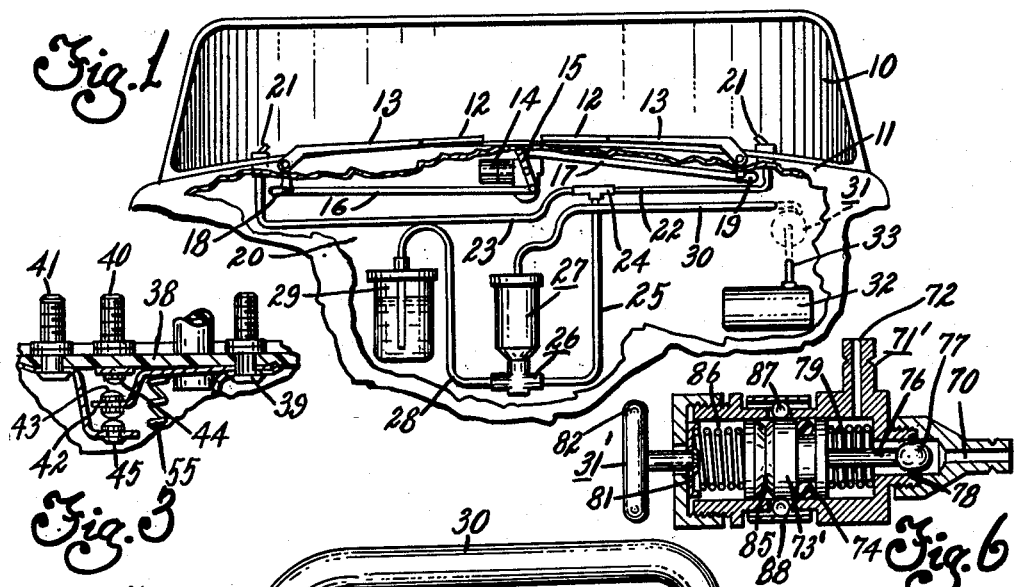
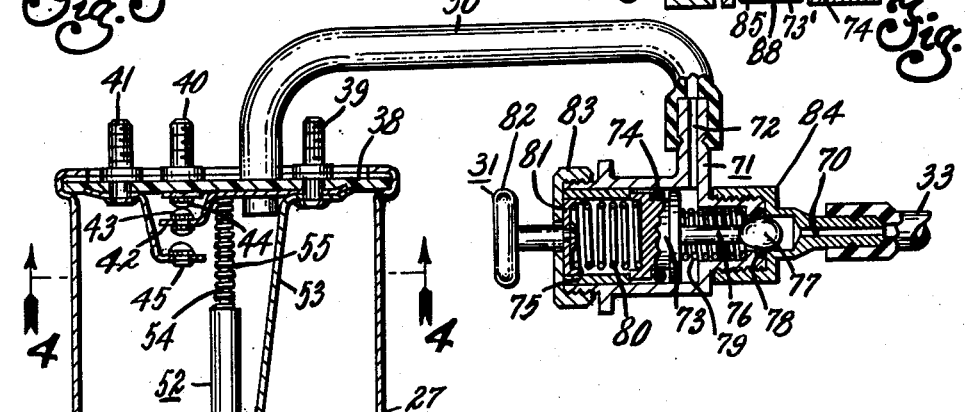
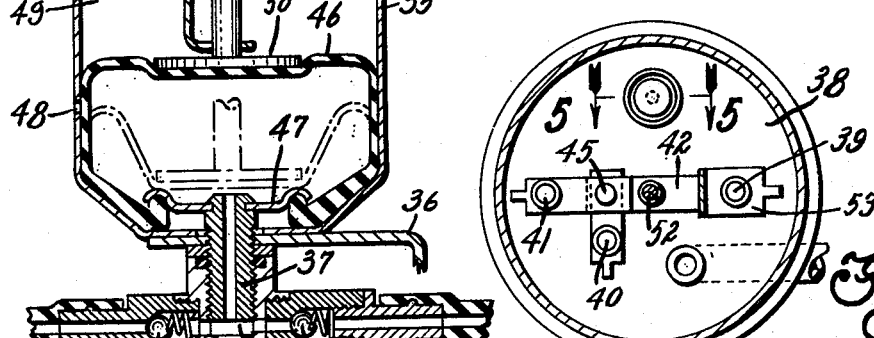
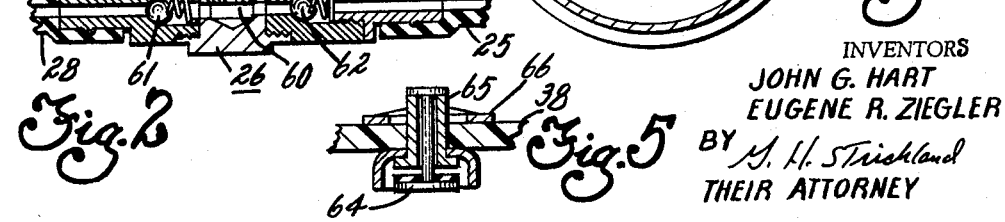
INVENTORS
JOHN G. HART
EUGENE R. ZIEGLER
BY M. H. Strickland
THEIR ATTORNEY nited States Patent Office 2,958,891
Patented Nov. 8, 1960

John G. Hart, Rochester, and Eugene R. Ziegler, Spencerport, N.Y., assignors to General Motors Corporation, Detroit, Mich., a corporation of Delaware Filed Aug. 21, 1957, Ser. No. 679,392

8 Claims. (Cl. 15—250.02)

This invention pertains to the art of windshield cleaning, and particularly to an improved windshield washer pump of the pneumatically operated type including means for controlling the simultaneous operation of a wiper motor therewith.

Mechanisms which automatically initiate and terminate operation of a wiper motor conjointly with operation of a washer pump have recently come into vogue. The present invention relates to a pneumatically operated washer pump including means for controlling the operation of a wiper motor so as to effect automatic cleaning of a vehicle windshield. Accordingly, among our objects are the provision of a pneumatically operated washer pump including means for controlling the conjoint operation of a wiper motor; the further provision of a pneumatically operated washer pump of the bellows type constructed so as to prevent damage to the mechanism due to freezing of the liquid solvent therein; and the still further provision of a pneumatic washer pump and control valve arrangement for automatically regulating the pressure of air supplied to the pump to effect the delivery stroke thereof.

The aforementioned and other objects are accomplished in the present invention by incorporating switch means within the pump assembly which are automatically closed during the delivery stroke of the washer pump to initiate operation of the wiper motor, and are automatically opened upon completion of the intake stroke of the pump so as to interrupt operation of the wiper motor whereby a complete washing and drying cycle can be automatically effected by actuating a single control knob. Specifically, the pneumatic washer pump comprises a housing having a flexible bellows therein constituting a liquid displacing member having an intake stroke and a delivery stroke. The interior of the bellows is connected through one-way check valves to a reservoir of liquid solvent and a discharge conduit. The bellows is connected to a rod guided for reciprocable movement with the housing, the rod being disposed in the air chamber of the housing. The rod has a reduced portion constituting a spring guide which receives one end of a compression spring, the other end of which bears against a leaf spring carrying a switch contact. The spring performs two functions, namely it maintains the switch contact in a first position when the washer pump is inactive so as to permit manual control of the wiper motor, and also prevents damage to the mechanism if the liquid solvent in the bellows should freeze by acting as a lost motion device.

The switch assembly controlled by the rod spring comprises a leaf spring which is normally biased to a second position wherein the wiper motor is energized when the bellows is compressed during the delivery stroke of the washer pump. When the bellows has completed its intake stroke due to inherent resiliency thereof, the spring is sufficiently compressed to move the leaf spring into the first position wherein control of the wiper motor is restored to the manual control switch.

The pump housing also contains a residual vent valve of the poppet type which is pressure responsive and automatically closes upon the application of air under pressure from the air pressure supply. However, upon compression of the bellows during the delivery stroke, the bellows opens a vent in the lower part of the housing to exhaust the compressed air to atmosphere, thereby permitting the bellows to expand and complete the intake stroke. During the intake stroke the residual vent valve is automatically opened to permit the exhaust of air from the air chamber when the bellows again closes the primary vent opening.

Two modifications of automatic push button operated pressure regulating valves are disclosed herein. In the first modification the valve comprises a housing having a reciprocable plunger therein constituting a valve element. The valve element is normally biased to a closed position by a spring. The inlet side thereof connects with a source of compressed air under high pressure, for instance 100 p.s.i. The push button is operatively connected with the plunger through a second spring such that when the push button is depressed the first spring is compressed and the valve is moved to the open position so that air under pressure is admitted to the valve housing. When the pressure in the valve housing reaches a predetermined pressure potential, for instance 10 p.s.i., this pressure acting on the plunger automatically moves the inlet valve to the closed position whereupon the air chamber of the pump housing is maintained at a pressure of 10 p.s.i. to effect the delivery stroke of the washer pump.

In the second embodiment, the automatic pressure regulating valve likewise includes a plunger which is spring biased to normally close the inlet valve. However, in this modification the plunger is formed with a detent groove adapted to receive spring pressed balls to maintain the valve in the open position without the necessity of having the operator continuously depress the push button. However, as in the first embodiment, when the pressure in the valve housing reaches a predetermined potential such as 10 p.s.i. the plunger is automatically moved so that the inlet valve is closed.

Operation of the first embodiment is as follows. The operator depresses the push button and maintains the same depressed thereby admitting air under pressure to the air chamber of the pump housing and then releases the button. The air under pressure closes the residual vent valve and compresses the bellows to effect the delivery stroke of the bellows thereby causing the wiper motor to be energized. The wiper motor may be of any suitable electric type such as disclosed in copending application Serial No. 551,800 filed December 8, 1955, in the name of Elmer E. Reese and assigned to the assignee of this invention now Patent No. 2,866,344 or Serial No. 592,045 filed June 18, 1956, in the name of Contant et al. and assigned to the assignee of this invention now Patent No. 2,828,460.

In the second embodiment, the operator merely depresses the button which then is maintained in the depressed position until a pressure of 10 p.s.i. is obtained in the valve housing. This pressure will effect a single delivery stroke, reset the button for a second manual operation, and on completion of the delivery stroke the bellows will, due to its inherent resiliency, effect the intake stroke and deenergize the wiper motor after the drying cycle.

Further objects and advantages of the present invention will be apparent from the following description, reference being had to the accompanying drawing, wherein preferred embodiments of the present invention are clearly shown.

In the drawing:
Figure 1 is a fragmentary view, partly in section and partly in elevation, of a vehicle equipped with the windshield washer of this invention.

Figure 2 is a fragmentary sectional view of a washer assembly constructed according to this invention.

Figure 3 is a fragmentary sectional view illustrating the manner in which the wiper switch is actuated during the delivery stroke of the washer pump.

Figure 4 is a sectional view taken along line 4—4 of Figure 2.

Figure 5 is a sectional view taken along line 5—5 of Figure 4.

Figure 6 is a sectional view of a modified push button operated pressure regulating valve.

With particular reference to Figure 1, a vehicle is shown including a windshield 10 and a cowl 11. In accordance with conventional practice, the vehicle is equipped with a pair of wiper blades 12 carried by wiper arms 13 which are movable over asymmetrical paths across the outer surface of the windshield 10. The wiper arms 13 are oscillated by an electric motor 14 through a double ended crank arm 15, opposite ends of which are pivotally connected to connecting rods 16 and 17 which in turn are connected to crank arms 18 and 19, respectively, and these are connected to the shafts for the wiper arms. The wiper motor and control circuit therefor may be of the type disclosed in either of the aforementioned copending applications, and motor 14 is attached to the vehicle firewall 20.

The vehicle is also equipped with a pair of washer nozzles 21 through which liquid solvent may be discharged onto the surface of the windshield into the paths of the wiper blades 12. The nozzles 21 are connected to discharge conduits 22 and 23 which are attached to the ends of T-coupling 24, the coupling also being connected to a discharge line 25 which connects with a check valve housing 26. The check valve housing 26 communicates with a washer pump generally designated by the numeral 27 and by conduit 28 to a liquid solvent reservoir 29 which is suitably supported within the vehicle. In addition, the washer pump 27 is connected by a conduit 30 to a valve assembly 31 which is connected to a compressed air tank 32, by means of conduit 33.

With reference to Figures 2 through 5, the washer pump includes a housing 35 supported by a bracket 36 and carrying a nipple 37 which supports the check valve housing 26. The pump housing 35 has an open end closed by a plate 38 of insulating material carrying terminals 39, 40 and 41. Terminal 39 is electrically connected to a leaf spring 42 carrying contact 43, terminal 40 is connected to a contact 44, and terminal 41 is connected to a contact 45. The leaf spring is inherently biased in a downward direction as viewed in Figure 2 wherein contact 43 will engage contact 45.

A bellows 46 of elastomeric material is disposed within a housing 35, the bellows constituting a liquid displacing member having an intake stroke and a delivery stroke. The open end of the bellows is retained in fixed position relative to the housing 35 by a plate 47 having a curved edge which receives a bead adjacent the opening in the bellows 46. In addition, the plate 47 is secured to the nipple 37 as shown. The housing 35 has a side wall opening 48, which is opened to the housing air chamber 49 when the bellows is collapsed as shown by the dotted lines in Figure 2. In addition, the bellows 46 is secured to a plate 50 carried by a rod 52 which is guided for reciprocable movement within the housing 35 by a bracket 53 supported by the terminal 39.

The guide rod 52 has a reduced end portion 54 constituting a spring guide, about which one end of a compression spring 55 is disposed, the other end of the compression spring engaging the leaf spring arm 42. When the bellows 46 is fully expanded as shown in full line in Figure 2, the spring 55 exerts pressure on the leaf spring 42 overcoming its inherent resiliency and maintaining the contact 43 in engagement with the contact 44. Upon compression of the bellows 46, the force of spring 55 acting on the leaf spring 42 is reduced thereby permitting the leaf spring to move contact 43 out of engagement with contact 44 and into engagement with contact 45. The spring 55 also performs another function, namely that of preventing damage to the mechanism if the liquid solvent in the bellows should freeze. Freezing of the liquid solvent in the bellows merely compresses the spring 55 which in this instance acts as a lost motion device.

The nipple 37 communicates with a bore 60 in the check valve housing 26. The bore 60 communicates with an inlet ball or other type check valve 61 and an outlet ball or other type check valve 62, both of which are spring biased to their closed positions. During the delivery stroke of the bellows 46, liquid solvent is forced from the interior of the bellows through check valve 62 into discharge conduit 25. During expansion of the bellows, liquid solvent is drawn through check valve 61 into the interior thereof so as to effect the intake stroke.

The insulating plate 38 has an aperture therein through which air conduit 30 extends. As will be disclosed hereinafter, air under pressure is admitted through conduit 30 to effect the delivery stroke of the bellows pump. In addition as seen in Figures 4 and 5, the plate 38 has vent valve associated therewith comprising a poppet type valve 64 contained in a housing 65 and maintained in assembled relation with the plate 38 by a spring fastener 66. The poppet valve prevents communication of the air chamber 49 with atmosphere when the air chamber is pressurized. However, when the pressure in air chamber 49 is substantially at atmospheric pressure, the poppet valve will be opened by gravity as seen in Figure 5 to permit the bellows 46 to expand fully to the position of Figure 2 after closure of the primary vent opening 48.

Air under pressure is admitted to conduit 30 by an automatic push button and pressure regulating valve generally designated by the numeral 31 in Figure 2. This valve comprises a housing 71 having an outlet port 72 connected to the conduit 33. A reciprocable plunger 73 is disposed within a housing 71, the plunger 73 carrying an O ring 74 so as to sealingly engage the inner wall of the housing. The plunger 73 is movable between a sleeve 75 and the end wall of the housing 71. The plunger 73 is formed with a stem 76 which carries a valve element 77 that is engageable with a valve seat constituted by an O ring 78. The plunger is normally maintained in engagement with the sleeve 75 by a spring 79, one end of which engages the end of the housing, and the other end of which engages the plunger. In addition, the plunger 73 is engaged by one end of a spring 80, the other end of which engages a disk 81 attached to a manually operable push button 82. The disk 81 is normally maintained in engagement with an end cap 83 of the housing. Similarly, the conduit 33 is connected to an end cap 84 which is attached to the housing 71.

When the push button 82 is manually depressed, the spring 80 is compressed and forces the plunger 73 to the right as viewed in Figure 2 thereby compressing spring 79 and moving the valve element 77 to an open position wherein port 70 is connected with port 72 through the valve housing. When the pressure within the valve housing acting upon the plunger 73 reaches a predetermined potential, for instance 10 p.s.i., the plunger 73 will move to the left thereby moving the valve element 77 to the closed position. If at this time the manual push button 82 is released the washer pump will make one complete cycle of operation including a delivery stroke and an intake stroke.

With reference to Figure 6, a modified embodiment push button and pressure regulating valve will be described, similar numerals depicting similar parts throughout the several views. The modified valve 31' includes a housing 71' having an outlet port 72 and an inlet port 70. A reciprocable plunger 73' is disposed within the housing 71, the plunger 73' carrying an O ring seal 74 and having a V-shaped annular groove 85. The plunger 73' is biased to the right by means of a compression spring 86, one end of which engages the plunger and the other end of which engages a disk 81 attached to a manually operable push button 82. In addition, the plunger includes a stem 76 carrying a valve element 77 which cooperates with a valve seat comprising an O ring seal 78, the stem 76 being encircled by compression spring 79, one end of which engages the housing and the other end of which engages the plunger 73'. In addition, the housing 71' is formed with a row of circumferentially spaced openings which receive detent balls 87 urged inwardly by a spring 88.

In the modified embodiment of Figure 6, when the push button 82 is depressed, the plunger 73' will remain in the depressed position since the detent balls 87 will be seated in the detent groove 85 on the plunger 73'. Consequently, the operator can remove his hand or finger from the push button 82. With the valve 77 open, air from the tank 32 will be admitted through the inlet port 70, and when the pressure acting on the plunger 73' and urging it toward the left reaches a predetermined potential, such as 10 p.s.i., the plunger will automatically move to the left unseating the balls 87 from the detent groove 85. Thereupon the washer pump will complete one cycle comprising an intake stroke and a delivery stroke.

Operation of the washer pump assembly of this invention is as follows. When the push button 82 of the disclosure of Figure 2 is depressed, the valve 77 is opened and high pressure air from the tank 32 flows into the valve housing. This pressure acting on the plunger 73 will move the plunger to its initial position wherein it engages sleeve 75 thereby closing the inlet valve 77. The predetermined pressure in conduit 30 and in the air chamber 49 will compress the bellows 46 and effect the delivery stroke of the washer pump. As soon as the bellows 46 is compressed sufficiently so that the stress of spring 55 is reduced to a predetermined value, the leaf spring 42 will move downwardly thereby moving contact 43 into engagement with contact 45 so as to initiate operation of the wiper motor 14. The compressed air in the air chamber 49 will then complete the delivery stroke until the vent opening 48 is opened, at which time the air will be exhausted to atmosphere thereby permitting the bellows to start its intake stroke. After the bellows expand, the stress in the spring 55 is increased and upon completion of the intake stroke, the spring 55 will move the contact 43 out of engagement with contact 45 and into engagement with contact 44. The residual venting valve enables the air chamber 49 to be connected to atmosphere when the bellows closes the opening 48 during the initial part of its intake stroke. However, as soon as the air chamber 49 is subjected to any pressure in excess of atmospheric pressure the poppet valve 64 will be closed.

Operation of the modified valve as shown in Figure 6 is as follows: When the button 82 is depressed so that the plunger 73' is retained in the valve open position by detent balls 87, the operator can remove his finger from the button 82. The air pressure admitted through the valve 77 will build up in the valve housing and effect the delivery stroke of the washer pump. When the pressure in the valve housing reaches a potential of 10 p.s.i., for instance, the plunger 73' will automatically move to the left so as to close the inlet valve 77. Consequently after a single delivery stroke, the washer pump will complete the intake stroke after which the wiper motor will be deenergized. When the washer pump of this invention is used with a wiper motor of the type shown in Serial No. 551,800, the terminal 39 is connected to the battery, the terminal 40 is connected to the manual control switch and the terminal 41 is connected to the wiper motor.

From the foregoing it is readily apparent that the present invention provides a pneumatically operable washer pump including means for effecting conjoint operation of a wiper motor so as to effect an automatic cleaning cycle comprising a washing cycle and a drying cycle, the duration of the drying cycle being determined by the intake period of the pump. Moreover, the mechanism is designed so that no damage will occur if the liquid solvent should freeze in the bellows.

While the embodiments of the invention as herein disclosed constitute preferred forms, it is to be understood that other forms might be adopted.

What is claimed is as follows:

1. A pneumatically operated washer pump comprising, a housing having a resilient bellows therein with an intake stroke and a delivery stroke, means for supplying fluid under pressure to said housing to compress said bellows to effect the delivery stroke thereof, a vent opening in said housing arranged to be normally closed by said bellows in its expanded condition, for automatically venting the housing to atmosphere upon completion of the delivery stroke of said bellows to enable said bellows to effect the intake stroke and vent valve means in said housing, said vent valve means being pressure actuated to a closed position when said housing is pressurized and gravity actuated to an open position when said housing is subjected to atmospheric pressure.

2. A pneumatically operated washer pump comprising, a housing having a resilient bellows therein with an intake stroke and a delivery stroke, means for supplying fluid under pressure to said housing to compress said bellows to effect the delivery stroke thereof, a vent opening in said housing arranged to be normally closed by said bellows in its expanded condition for automatically venting the housing to atmosphere upon completion of the delivery stroke of said bellows to enable said bellows to effect the intake stroke, and residual vent valve of the poppet type in said housing for venting said housing to atmosphere after the vent opening is closed by said bellows during the intake stroke thereof.

3. A pneumatically operated washer pump comprising, a housing having a resilient bellows therein with an intake stroke and a delivery stroke, a wiper control disposed within said housing, a wiper control actuating rod disposed within said housing and attached to said bellows and movable therewith for actuating said wiper control upon movement of said bellows, means supported by said housing and engageable with said rod for guiding its movement, means for supplying fluid under pressure to said housing to compress said bellows and effect the delivery stroke thereof, means automatically venting said housing to atmosphere upon completion of the delivery stroke of said bellows to enable said bellows to effect the intake stroke, and lost motion means between said wiper control and said rod for preventing damage to the housing upon freezing of liquid in said bellows.

4. A pneumatically operated washer pump comprising, a housing having a resilient bellows therein with an intake stroke and a delivery stroke, a wiper control disposed within said housing, a wiper control actuating rod attached to said bellows and movable therewith for actuating said wiper control upon movement of said bellows, means supported by said housing and engageable with said rod for guiding its movement, means for supplying fluid under pressure to said housing to compress said bellows and effect the delivery stroke thereof, means automatically venting said housing to atmosphere upon completion of the delivery stroke of said bellows to enable said bellows to effect the intake stroke, said rod having a reduced diameter portion constituting a spring guide, said wiper control including a switch comprising a leaf spring normally biased to a first position when said bellows is collapsed, and a spring encircling said spring guide, one end of said spring engaging said leaf spring for maintaining the leaf spring in a second position when said bellows is completely expanded.

5. In combination with a pneumatically operated washer pump having a liquid displacing member with an intake stroke and a delivery stroke, a control valve for admitting air under pressure to said pump to effect the delivery stroke of said liquid displacing member comprising, a housing having a reciprocable plunger therein, first resilient means acting on said plunger for normally maintaining the same in a first position, a valve element carried by said plunger and which is closed when said plunger is in said first position, manual means for effecting movement of said plunger and said valve element to a second position wherein said valve element is open, and second resilient means interposed between said manual means and said plunger whereby when said valve element is open, pressurized air acting on said plunger automatically moves said valve element to the closed position upon the attainment of a predetermined pressure potential within said housing acting on said plunger.

6. The control valve set forth in claim 5 including a sleeve constituting an abutment for said plunger for determining the first position thereof.

7. The control valve set forth in claim 5 wherein said plunger is formed with a groove, and wherein said housing includes detent means engageable with said groove for determining the first position of said plunger.

8. The control valve assembly set forth in claim 5 wherein said manual means for moving said plunger to the second position comprises a push button, and wherein momentary depression and release of said push button will effect a complete cycle of said washer pump comprising the delivery stroke and the intake stroke.

References Cited in the file of this patent

UNITED STATES PATENTS

| | | |
|---|---|---|
| 2,743,473 | Oishei | May 1, 1956 |
| 2,873,467 | Oishei | Feb. 17, 1959 |

FOREIGN PATENTS

| | | |
|---|---|---|
| 141,006 | Australia | Apr. 30, 1951 |
| 997,554 | France | Sept. 12, 1951 |